May 30, 1933. S. W. CADY 1,911,306
POWER LIFT MECHANISM FOR TRACTORS
Original Filed Oct. 30, 1931 3 Sheets-Sheet 3

Inventor
Sherman W. Cady
By H. P. Doolick
Atty.

Patented May 30, 1933

1,911,306

UNITED STATES PATENT OFFICE

SHERMAN W. CADY, OF CANTON, ILLINOIS, ASSIGNOR TO INTERNATIONAL HARVESTER COMPANY, A CORPORATION OF NEW JERSEY

POWER LIFT MECHANISM FOR TRACTORS

Refiled for abandoned application Serial No. 572,038, filed October 30, 1931. This application filed October 14, 1932. Serial No. 637,807.

This invention relates to a power lift attachment for tractors carrying implements mounted thereon.

This application is filed as a substitute for application Serial No. 572,038, filed October 30, 1931, which has become abandoned.

A principal object of the invention is to provide a power lift device of a novel and improved construction. Another object is to provide a power lift attachment adapted to be used in connection with tractor mounted implements for selectively lifting individual soil working units or for independently lifting certain groups of units such, for example, as forwardly positioned units as one group, and rearwardly positioned units as another group.

In connection with this object a more specific object is to provide lifting means for fore and aft spaced implements of such a nature that the soil working engagement of the units can be terminated on the same transverse line as, for example, at the end of a row.

These and other objects which will be apparent from the detailed description to follow, are accomplished by a construction as shown in the drawings, in which.

Figure 1:
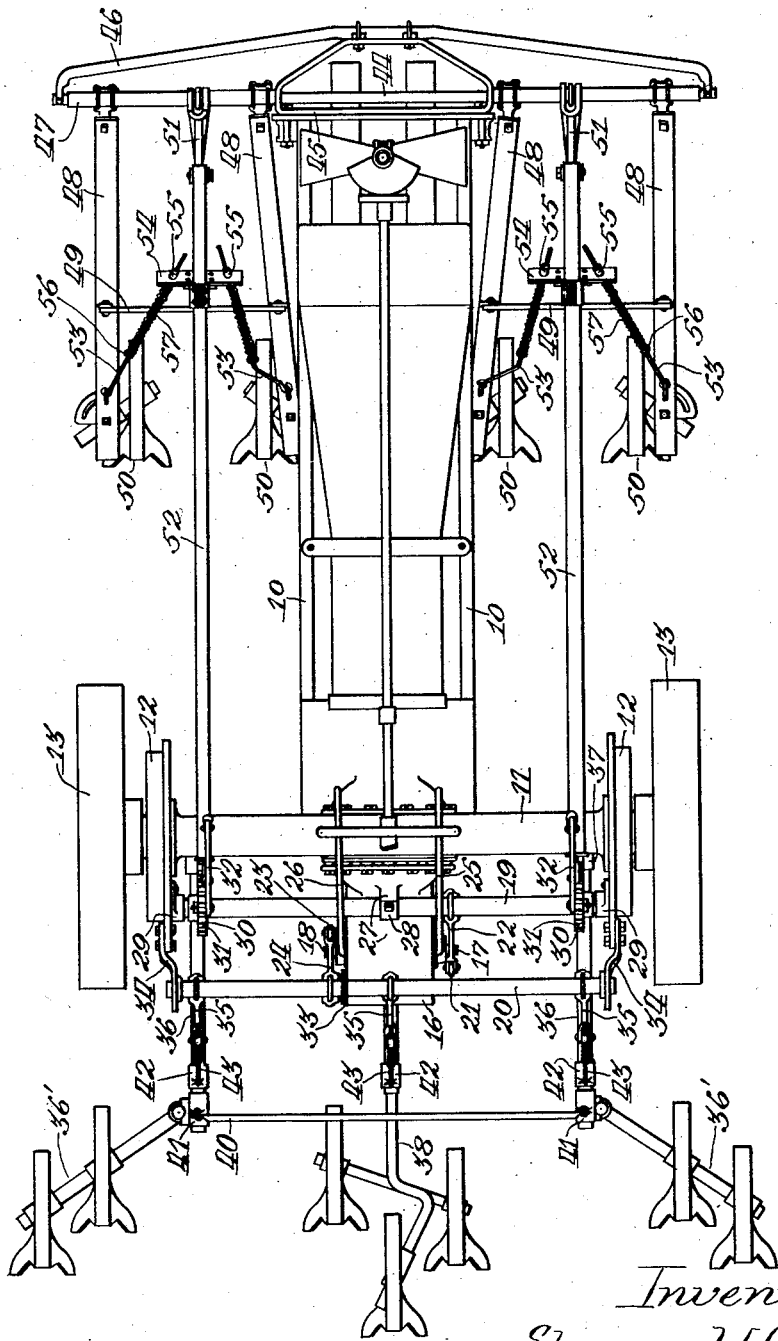
Figure 1 is a plan view showing an embodiment of the invention in connection with a well known tricycle type of tractor.
Figure 2:
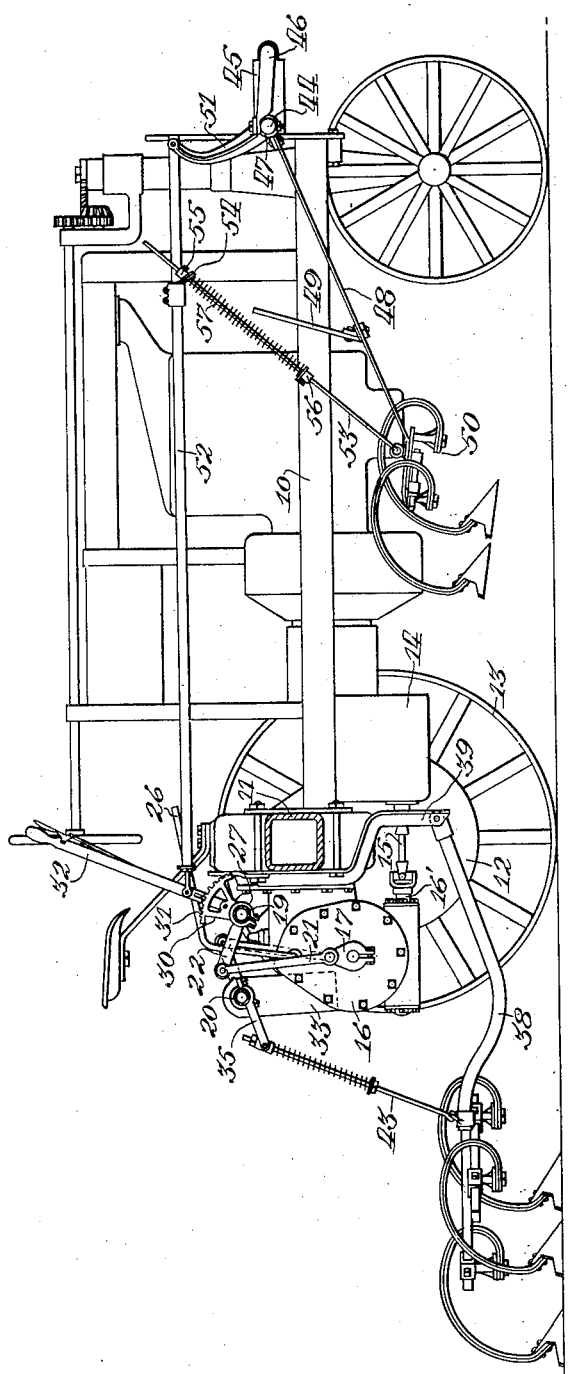
Figure 2 is a side elevation with one rear wheel broken away in section, showing the same construction as Figure 1.
Figure 3:
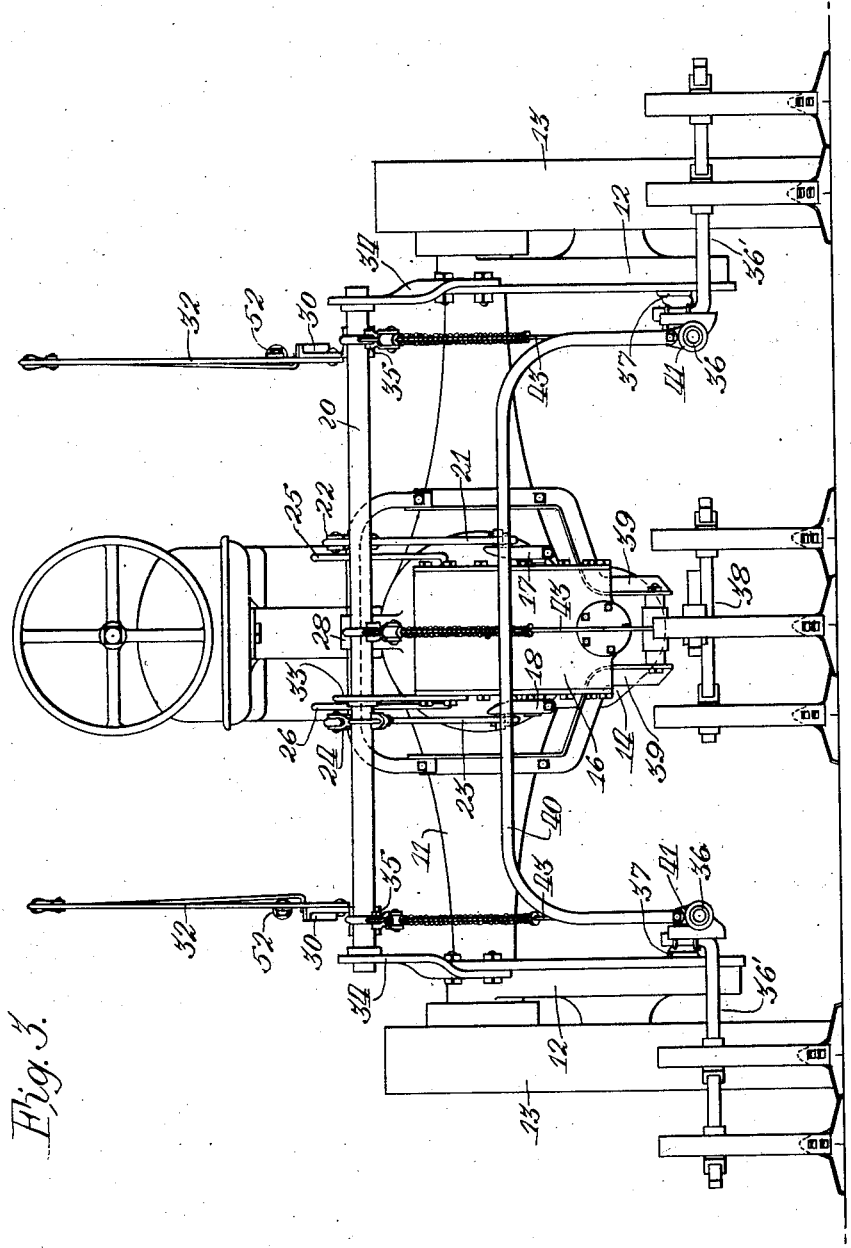
Figure 3 is a rear view of the same construction shown in Figure 1.

The tractor shown in the drawings is of a well known construction, having side frame members 10, a rear axle and differential housing 11, depending gear housings 12 rigidly connected to the ends of the housing 11, and wheels 13 mounted on stub axles extending outwardly from the lower portions of the housings 12. A depending housing 14 forwardly of the rear axle housing 11 contains gearing connected to the tractor drive mechanism for operating a power takeoff shaft 15 which extends centrally rearwardly from said housing under the axle housing 11.

A power lift mechanism is enclosed in a casing 16 formed as a unitary casting. Said casing is shaped to house the power lift mechanism and is provided with bearings for the projecting shafts constituting a part of the mechanism. A forwardly projecting shaft 16' is in alignment with the power takeoff shaft and is connected thereto by universal joints. At each side of the casing 16 laterally projecting shafts are provided with cranks 17 and 18 for operating, respectively, the power lift rock shafts 19 and 20. The crank 17 is connected by a link 21 to a lever arm 22 rigidly mounted on the rock shaft 19. The crank 18 is pivotally connected by a link 23 to a lever arm 24 rigidly mounted on the rock shaft 20. The cranks 17 and 18 are a part of the power lift mechanism and may be independently operated half revolutions by the actuation of the hand levers 25 and 26. The particular construction of the power lift and the means by which the cranks 17 and 18 are operated does not form a part of this invention and is not, therefore, shown in detail. Said mechanism is described and claimed in the co-pending application, Serial No. 540,142, filed May 26, 1931.

The shaft 19 extends transversely across the rear of the tractor, spaced rearwardly from the housing 11. An integral bearing portion 27 on the casing 16 and a bearing cap 28, secured to said portion, forms a central bearing for said shaft. At each end of the shaft 19 bearings are formed in brackets 29, rigidly secured to the inside portions of the housings 12. Adjacent the ends of the shaft 19 lifting brackets 30 are rigidly secured and extend upwardly therefrom. The outer portions of said brackets are formed as notched sectors 31 for the engagement of latches carried by adjusting levers 32 pivotally mounted on the brackets 30. Said levers are connected to lifting means for forwardly positioned implements, to be hereinafter described.

The rock shaft 20 is provided with a center bearing support 33 which is rigidly secured to the power lift casing 16 at one side thereof. The shaft 20 extends across the rear of the tractor spaced from the shaft 19. At the outer ends of the shaft 20 bearing brackets 34 are provided. Said brackets are rigidly secured to the housings 12. Adjacent each end of the shaft 20 and at the center thereof rearwardly extending lever arms 35 are rigidly secured for lifting the rearwardly positioned implements.

The rearwardly positioned implements illustrated in the embodiment of the invention shown, are of the same type shown in the co-pending application, Serial No. 462,895, filed June 21, 1930. The drawbar ordinarily attached to a tractor of this type, is removed when a construction as shown as utilized. At each side of the tractor at the inside of the depending housing 12 a rearwardly extending cultivator beam 36 is pivotally attached on the trunnion 37 normally forming the drawbar support. A plurality of soil working units 36' are attached by suitable conventional means to each of the beams 36. A center beam 38 is pivotally connected to a support 39 on a transverse axis. The pivot is of such a nature as to prevent lateral movement of the beam 38. The support 39 consists of a plurality of bars secured to the rear axle housing 11. A plurality of soil working units 37 are mounted on the beam 38. As previously stated, the beam 38 is prevented from lateral swing by the construction of its connection with the support 39. The outer beams 36 are maintained against lateral movement by an arch 40 pivotally connected to brackets 41, mounted at the rear ends of the beams.

Adjacent the rear ends of the beams 36 connecting members 42 are mounted, to which are secured lifting links 43. Said links are in the form of rods pivotally mounted between the bifurcated ends of the lifting arms 35. Nuts are threaded at the outer ends of the rods 43. Intermediate the ends of said rods compression springs abut at one end the blocks 44 and at the other end stops. This lifting link construction is of a conventional nature and provides means for positively lifting the cultivating beams and resiliently pressing them downwardly into operating position. An exactly similar link 43 is connected to a member 42 on the center beam 38 and to the center lifting arm 35.

By the operation of the rock shaft 20 it will be understood that all of the rearwardly positioned soil working units are simultaneously lowered into working position and lifted by movement of the rock shaft in the respective angular directions.

The forwardly positioned soil working units illustrated are attached to the tractor by a construction similar to that shown in the co-pending application, Serial No. 483,164, filed September 20, 1930. A cross beam 44 is secured forwardly of the tractor by a frame structure 45 which is in turn rigidly secured to the forward portion of the tractor. A brace bar 46 is secured to the outer ends of the cross beam 44 and to the forwardly extending portion of the frame structure 45. The cross beam is in the form of a circular shaft and a sleeve 47 is rotatably mounted on said shaft at each end between the frame structure 45 and the end of the beam. Rearwardly and downwardly extending cultivating beams 48 are rigidly secured by attaching brackets to the sleeves 47. Cross arches 49 connect the cultivating beams at each side of the tractor together to prevent lateral movement of such beams with respect to each other. A soil working unit 50 is connected to each of the cultivator beams, the construction shown being adaptable for cultivating the adjacent sides of rows of plants. A lifting lever 51 is rigidly secured at each side of the tractor to the respective sleeves 47. A lifting beam 52 is pivotally connected to each of the levers 51 and to the lifting levers 32 at the rear of the tractor, previously described. Said beam is of a construction strong enough to maintain rigidity under compression sufficient to rotate the levers 51 forwardly for lifting the cultivating beams 48. To assist in lifting said beams and to provide means for resiliently holding the soil working implements in working position rods 53 are pivotally connected at the rear end of each of the cultivator beams and extend upwardly and forwardly through laterally extending members 54 secured to the lifting beams 52 at positions rearwardly of the forward ends and somewhat forwardly from the positions of the earth working units. On each of the rods 53 a stop 55 is provided at the outer end beyond the member 54 through which the rod slidably extends and a second stop 56 is provided intermediate the ends of the rod. A compression spring 57 abutting the lower side of the member 54 and the stop 56, provides the means for resiliently holding the soil working units in working position.

The operation of the tractor mounted implement, as illustrated, will be clear from the above description. The forward rock shaft 19, which is actuated by the power lift mechanism through the crank 17, the link 21 and the lever 22, is operable to lift and lower the forwardly positioned soil working units by means of the lifting beams 52 and the associated elements at each end thereof. The rearwardly positioned units are lifted and lowered by means of the rock shaft 20 and the associated parts, above described in detail. The operator of the tractor by independent operation of the levers 25 and 26 may selectively lift either the forwardly or the rearwardly positioned implements.

This is a particularly advantageous feature under a great many conditions. For example, when an obstruction such as a rock is being encountered, the front implements may be lifted to pass over the rock and then lowered into working position. The rear implements may then be operated in a like manner. Another example of the utility of this construction is when cultivating row crops it is desirable that both the rear and front implements be operated to the end of the row wherever possible. Whenever there is sufficient room for the tractor to maintain its forward movement the forward implements may be lifted when the end of the row is reached. Subsequently the rear implements may be lifted as soon as said implements have reached the end of the row. The same procedure may be followed in reverse manner when beginning the row.

It is to be understood that applicant has shown and described only a preferred embodiment of his improved power lift attachment for tractor mounted implements and that he claims as his invention all modifications falling within the scope of the appended claims.

What is claimed is:

1. A tractor field implement comprising a tractor, forwardly positioned soil working implements connected to said tractor, a rock shaft mounted transversely of the tractor at the rear thereof, means for connecting said shaft to the forward units for altering their working positions, rearwardly positioned units connected to the tractor, a second rock shaft mounted at the rear of the tractor transversely thereof, means for connecting said shaft to the rearwardly positioned unit for altering their working positions, a power lift casing mounted at the rear of the tractor, said casing having a part of lifting arms projecting therefrom and being operable to lift selectively either arm, and actuating links connecting said cranks to the rock shafts, whereby the front and rear units may be selectively and independently lifted.

2. In a tractor mounted field implement having soil working units mounted at different locations thereon, a power lift mechanism mounted on the tractor and operated thereby, said mechanism comprising independently operable lift means, parallel rock shafts mounted on the tractor, means for connecting each of said rock shafts to one of the soil working units, and means for connecting each rock shaft to one of the independently operable lift means whereby each unit may be independently lifted and lowered.

3. A tractor mounted field implement comprising, in combination with a tractor having soil working units mounted at different locations thereon, a power lift mechanism mounted on the tractor and operated thereby, said mechanism being provided with independently operable lift means, parallel rock shafts mounted on the tractor transversely thereof, means for connecting each of said rock shafts to one of the soil working units, and means for connecting each rock shaft to one of the independently operable lift means whereby each unit may be independently adjusted.

4. A tractor mounted field implement comprising, in combination with a tractor, a plurality of soil working implements mounted at different locations on the tractor, a power lift mechanism mounted on the tractor and operable thereby, said mechanism including a plurality of independently operated lift means, parallel rock shafts mounted transversely of the tractor at the rear thereof, each of said shafts being connected to one of the lift means, and means connecting each of the soil working implements to one of the rock shafts whereby the units may be selectively and independently lifted and lowered.

5. A tractor field implement comprising, in combination with a tractor, forwardly positioned soil working implements connected to the tractor, a rock shaft mounted on the tractor, means for connecting said shaft to the forward units, rearwardly positioned implements connected to the tractor, a second rock shaft parallel to the first named rock shaft, means for connecting said shaft to the rearwardly positioned implement, a casing mounted on the tractor, said casing enclosing power lift mechanism and having a pair of lifting arms projecting therefrom, and actuating links connecting said arms respectively to the rock shafts whereby the front and rear units may be selectively and independently lifted.

6. A tractor field implement comprising, in combination with a tractor, forwardly positioned soil working implements connected to the tractor, a rock shaft mounted on the tractor transversely thereof, means for connecting said shaft to the forward units, rearwardly positioned implements connected to the tractor, a second rock shaft parallel to the first named rock shaft, means for connecting said shaft to the rearwardly positioned implements, a casing mounted on the tractor, said casing containing power lift mechanism having a pair of lifting arms projecting therefrom, and actuating links connecting said arms respectively to the rock shafts whereby the front and rear units may be selectively and independently lifted.

7. A tractor field implement comprising, in combination with a tractor, soil working units mounted at different locations thereon, a pair of rock shafts mounted at the rear of the tractor, said rock shafts being parallel and extending transversely across the tractor, a power lift casing mounted at the rear of the tractor, said casing enclosing power lift mechanism and having a pair of lifting arms projecting therefrom, said arms being independently operable, and actuating links connecting the arms respectively to the rock shafts whereby the soil working units may be independently adjusted.

8. A tractor field implement comprising, in combination with a tractor having a transverse rear axle housing, soil working units mounted at different positions thereon, a pair of rock shafts mounted at the rear of the tractor on the axle housing, said rock shafts being parallel and extending transversely across the tractor, a power lift casing mounted at the rear of the tractor on the axle housing, said casing having a pair of lifting arms projecting therefrom, said arms being independently operable, and actuating links connecting the arms respectively to the rock shafts whereby the soil working units may be independently adjusted.

In testimony whereof I affix my signature.

SHERMAN W. CADY.